United States Patent [19]

Burt

[11] Patent Number: 5,063,603
[45] Date of Patent: Nov. 5, 1991

[54] DYNAMIC METHOD FOR RECOGNIZING OBJECTS AND IMAGE PROCESSING SYSTEM THEREFOR

[75] Inventor: Peter J. Burt, Princeton Township, Mercer County, N.J.

[73] Assignee: David Sarnoff Research Center, Inc., Del.

[21] Appl. No.: 432,013

[22] Filed: Nov. 6, 1989

[51] Int. Cl.$^5$ .............................................. G06K 9/00
[52] U.S. Cl. ........................................ 382/37; 382/2; 382/39
[58] Field of Search ................... 382/2, 37, 38, 41, 39; 358/84

[56] References Cited

U.S. PATENT DOCUMENTS

| | | | |
|---|---|---|---|
| 3,947,833 | 3/1976 | Eckstein, Jr. | 382/37 |
| 3,970,841 | 7/1976 | Green | 356/39 |
| 4,175,860 | 11/1979 | Bacus | 382/2 |
| 4,385,322 | 5/1983 | Hubach | 358/221 |
| 4,620,318 | 10/1986 | Hill | 382/2 |
| 4,692,806 | 9/1987 | Anderson | 358/209 |
| 4,706,296 | 11/1987 | Pedotti et al. | 382/6 |
| 4,858,000 | 8/1989 | Lu | 382/2 |

Primary Examiner—Leo H. Boudreau
Assistant Examiner—David Fox
Attorney, Agent, or Firm—William J. Burke

[57] ABSTRACT

A time series of successive relatively high-resolution frames of image data, any frame of which may or may not include a graphical representation of one or more predetermined specific members (e.g., particular known persons) of a given generic class (e.g. human beings), is examined in order to recognize the identity of a specific member if that member's image is included in the time series. The frames of image data may be examined in real time at various resolutions, starting with a relatively low resolution, to detect whether some earlier-occurring frame includes any of a group of image features possessed by an image of a member of the given class. The image location of a detected image feature is stored and then used in a later-occurring, higher resolution frame to direct the examination only to the image region of the stored location in order to (1) verify the detection of the aforesaid image feature, and (2) detect one or more other of the group of image features, if any is present in that image region of the frame being examined. By repeating this type of examination for later and later occurring frames, the accumulated detected features can first reliably recognize the detected image region to be an image of a generic object of the given class, and later can reliably recognize the detected image region to be an image of a certain specific member of the given class.

19 Claims, 4 Drawing Sheets

DYNAMIC METHOD FOR RECOGNIZING OBJECTS AND IMAGE PROCESSING SYSTEM THEREFOR

BACKGROUND OF THE INVENTION

This invention is directed to a dynamic image processing technique for recognizing objects of a given class which are graphically represented in a time series of successive relatively high-resolution frames of image data.

Techniques for recognizing pattern shapes of objects graphically represented in image data are known in the art. Further, techniques for discriminating between moving and stationary objects having a preselected angular orientation, or objects having any other predetermined feature of interest, are also known in the art.

In this regard, reference is now made, by way of examples, to U.S. Pat. No. 4,692,806, which issued to Anderson et al. on Sept. 8, 1987, and to U.S. Pat. No. 4,385,322, which issued to Hubach et al. on May 24, 1983.

Anderson et al. disclose an image-data reduction technique in which an originally wide field-of-view, high-reduction image comprised of a first given number of pixels is processed to derive a wide field-of-view, low resolution image comprised of second given number of pixels smaller than the first given number. Based on the location of a detected feature of interest present in the derived low resolution image, a movable window comprised of no more than the second given number of pixels can be employed to obtain the location of that narrow field-of-view portion of the original high-resolution image which contains the detected feature of interest. Anderson et al. utilize known so-called multi-resolution pyramid processor techniques to implement their image-data reduction.

While the Anderson et al. data reduction technique may operate repeatedly on a time series of successive, relatively high-resolution frames of image data, the detection of the feature of interest is similar during each operation (i.e., during each repeated operation, the feature of interest is either detected or it is not, independent of whether or not the feature of interest was detected on a previous one of the repeated operations).

Hubach et al. disclose a pattern recognition method which also employs a data reduction technique. A reference scene is first recorded and stored in a fine format and then in a coarse format. Stored coarse information of the reference scene is compared in real time with coarse information from a wide field-of-view subject scene and a correlation number (probability) indicating the percentage of match is employed to determine the location of the best match (if any) between the subject and reference scenes. Only the narrow field-of-view area of the subject scene which is in the vicinity of the coarse match is then compared with the stored fine information of the reference scene. The location of the best match is precisely determined in accordance with the highest correlation number (probability) of the match of the subject scene with the fine stored information of the reference scene. It should be noted that in Hubach et al. the stored coarse and fine reference information remains fixed.

Consider the case in which the object to be recognized is a three-dimensional movable object which is graphically represented in a time series of successive frames of image data, each of which is comprised of a two-dimensional projection of the three-dimensional object. In such a case, the size and shape of the two-dimensional projection in each of the respective frames will depend on the distance of the three-dimensional object in a direction perpendicular to the projection thereof and the angular orientation of the three-dimensional object with respect to its projection in that frame. If the three-dimensional object moves, the size and shape of its graphical representation will change from frame to frame. Thus, much less than complete information about such a three-dimensional moving-object can be obtained from any single frame. However, by cumulatively adding to the information obtained from any single frame, the information obtained from all previous frames of the times series, it becomes possible to collect sufficient information to selectively recognize the identity of such a three-dimensional movable object with great precision. The dynamic image processing method of the present invention is directed to an efficient solution to this type of recognition problem.

SUMMARY OF THE INVENTION

Specifically, the dynamic image-processing method of the present invention recognizes objects of a given class which all possess a group of known generic attributes which, taken as a whole, distinguish objects of this given class from objects not of this given class. The method is responsive to a means for controlling this processing and for specifying a set of decision criteria. This method is also responsive to stored data which initially defines a limited number of separate features related to the group of generic attributes, any of which initially stored features is likely to be present in a sequence of one or more successive frames of image date if an object of the given class is graphically represented in that sequence. The method comprises the following steps:

First, successive relatively high-resolution frames of image data in a time series are analyzed in a multi-resolution pyramid processor comprised of at least one level that exhibits a lower resolution than that of the high-resolution frames. Under the control of the stored program and in response to at least a first one of the separate features initially defined by the stored data, a first determination is made in accordance with the decision criteria as to a first probability with which any of the lower-resolution levels of the multi-resolution pyramid processor in a sequence of one or more relatively early-occurring frames of the times series may include as part of the image data thereof at least the first one of the separate features of objects of the given class. If this first probability is at least equal to a first predetermined threshold value, data defining at least the relative location of that part of the image data within the early-occurring frames of the sequence is added to the stored data, thereby enhancing the stored data.

Then, under the control of the stored program and in response to the enhanced stored data, a second determination is made in accordance with the decision criteria as to a second probability that any of the levels of the multi-resolution pyramid processor of the sequence of one or more relatively later-occurring frames of the time series verifies that the aforesaid part of the image data includes at least a second one of the separate features in addition to the first feature. If the second probability is above a second predetermined threshold, the aforesaid part of the image data is recognized as being a graphical representation of an object of the given class. However, if the second probability is below a third predetermined threshold, which third predetermined threshold is significantly below the second predetermined threshold, the aforesaid part of the image data is recognized as not being a graphical representation of an object of the given class. In those cases in which the second probability is in a range between the second and third probabilities, the further data defined by the aforesaid verification step is added to the stored data, thereby further enhancing the stored data. Furthermore, if the second probability is in this range, the verification step and the further enhancement of the stored data in response thereto is recursively repeated for relatively later and later occurring sequences of one or more frames of the time series until the probability determined by such repeated step either rises above this second predetermined threshold or falls below the third predetermined threshold.

DESCRIPTION OF THE PREFERRED EMBODIMENTS

A human observer has no difficulty in recognizing objects of given class (e.g., other human beings) present in a complex scene. In fact, even though the observer knows hundreds of different individuals, he or she has no difficulty recognizing any one of them who is present in the observed scene.

All human beings possess a group of known generic attributes which, taken as a whole, distinguish them from other objects which are not human. However, it is differences in facial features that primarily distinguish one individual from another.

Figure 1:
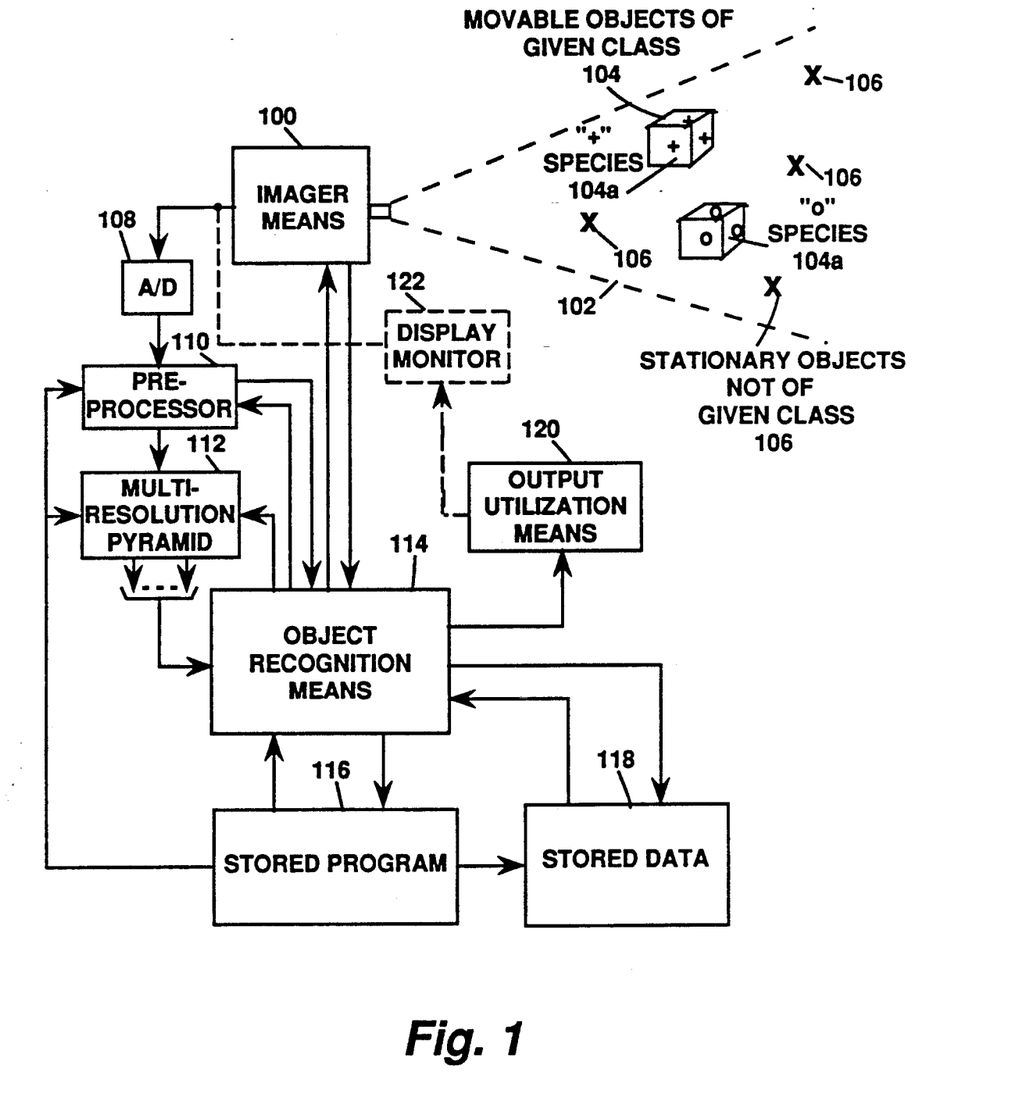
FIG. 1 is a functional diagram illustrating the principles of the present invention.

The dynamic-image processing method of the present invention, shown in FIG. 1, mimics the ability of a human being to recognize objects of a given class which all possess a group of known generic attributes and which, taken as a whole, distinguish objects of this given class from objects which are not of the given class. Further, the dynamic image processing of the present invention is capable of distinguishing among a plurality of preselected members of the given class, each of which preselected members is individually defined by possessing a unique set of known species of each of at least a sub-group of the known generic attributes.

Referring to FIG. 1, there is shown imaging means 100 having a field-of-view 102. Imaging means 100 may be comprised of a structure for receiving radiation reflected from objects within a field-of-view 102 which are illuminated by an external radiator. Alternatively, imager means 100 may be comprised of a structure that includes means for illuminating objects within field-of-view 102 with radiation and means for receiving reflected echoes from such objects (these echoes also may provide object-distance information). Further, imaging means 100 may be responsive to radiation of any given wavelength portion of electromagnetic, ultrasonic and/or any other type of wave-energy spectrum. Within field-of-view 102 are located two movable objects of given class 104 (presented in FIG. 1 as movable cubes). While both of the objects possess all of the generic attributes of a cube, they specifically differ from one another in that the faces of the top cube are marked with a "+" while the faces of the bottom cube are marked with an "o". Further, included within field-of-view 102 are a plurality of various stationary objects 106 not of the given class 104.

Imaging means 100 produces a two-dimensional projection of each of three-dimensional cubes 104. Since cubes 104 are movable, the shape and size of the projection of each cube varies with the orientation and distance of that cube from imager means 100 at any given time.

The output of imaging means 100 is comprised of a time series of successive relatively high-resolution frames of image data, each of which frames graphically represents, in analog form, a two-dimensional projection of each of the cubes of the class 104 and objects 106 in its spatial position within the field-of-view at the time of occurrence of that frame in the time series. Analog-to-digital (A/D) converter 108 converts the image data in each successive frame to digital form for processing by a digital processor comprised of preprocessor 110, multi-resolution pyramid processor 112, object-recognition means 114, stored program 116, and stored data 118.

Figure 3:
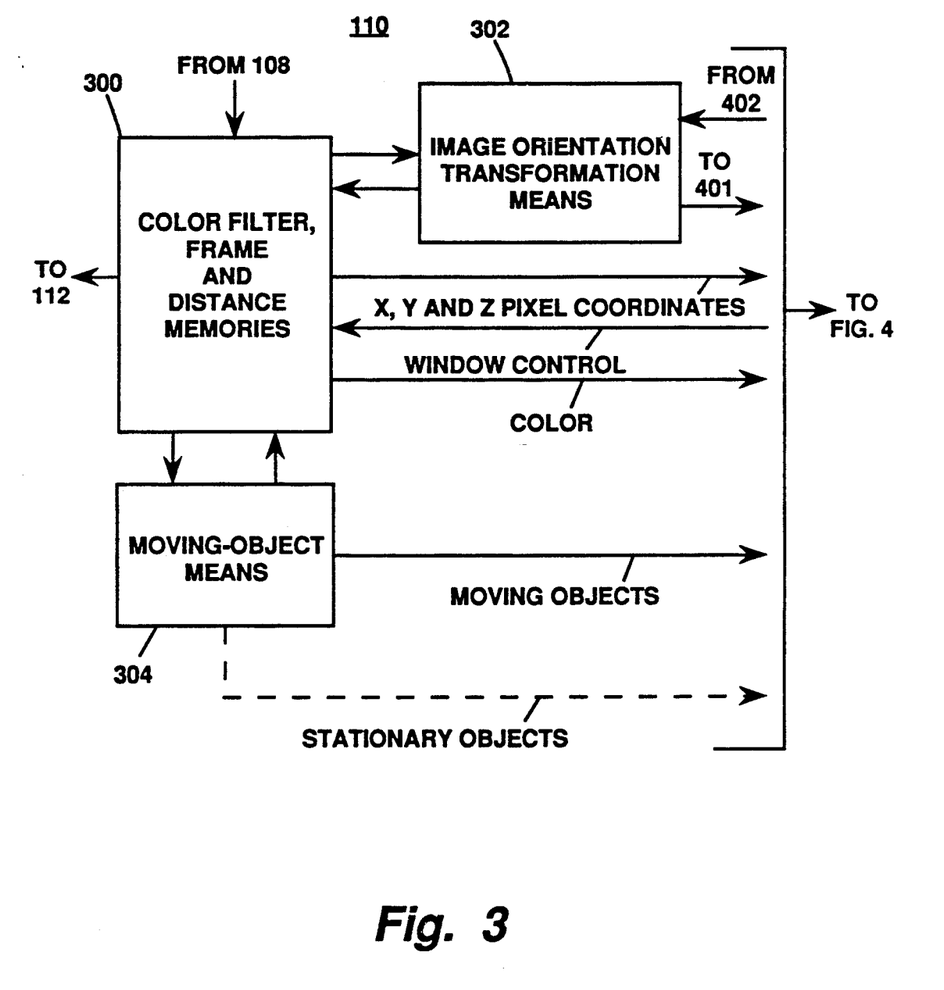
FIG. 3 illustrates an example of the preprocessor of FIG. 1.
Figure 4:
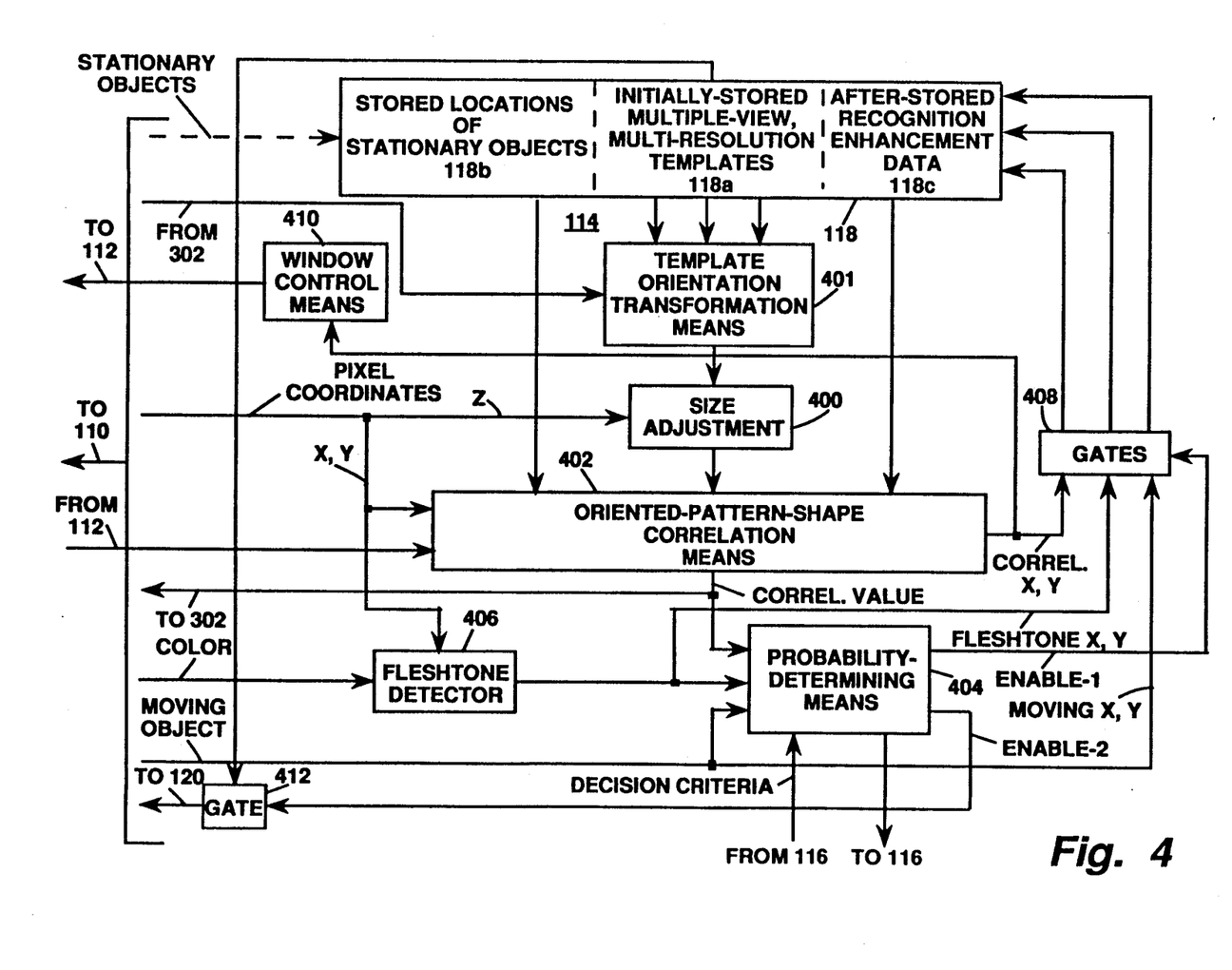
FIG. 4 is an example of the stored data and of the object-recognition means of FIG. 1.

In FIG. 1, the digital processor is shown as a system of interconnected functional blocks, in which each block corresponds to a subsystem. In practice, a digital processor system may be implemented in software (i.e., programmed computer system) and/or in hardware (i.e., hardwired elements). A detailed example of the subsystem of pre-processor 110 is shown in FIG. 3 and detailed examples of object recognition means 114 and stored data 118 are shown in FIG. 4, which FIGURES are later discussed below.

Stored program 116 applies control inputs to each of pre-processor 110, multi-resolution pyramid processor 112, object recognition means 114 and stored data 118 for controlling the sequence of operations of these subsystems in accordance therewith. This sequence of operations is modified in accordance with information fed back to stored program 116 from object recognition means 114. Control information is also fed back from object recognition means 114 through each of imager means 100, preprocessor 110 and multi-resolution pyramid processor 112. In addition, object recognition means 114 applies enhanced data storage to stored data 118.

Image data in digital form is applied as a signal input to preprocessor 110. Preprocessor 110, in accordance with the control information applied thereto from object recognition means 114 and stored program 116, modifies the image data applied as an input thereto and then applies this modified image data as an input to multi-resolution pyramid processor 112.

Multi-resolution pyramid processor 112, which is capable of performing the type of functions taught by the aforesaid Anderson et al patent, may be structurally implemented in accordance with the teachings of U.S. Pat. No. 4,703,514, which issued Oct. 27, 1987 to Van der Wal and is entitled "Programmed Implementation Of Real-Time Multi-Resolution Signal Processing Apparatus."

Output data from pyramid processor 112 is applied as a first signal input to object-recognition means 114. In addition, object recognition means 114 receives second signal input information directly from preprocessor 110. In addition, information may be fed back from imager means 100 as an input to object recognition means 114. Also, under the control of stored program 116, stored data 118 applies selected stored data as an input to object-recognition means 114.

Output information from object recognition program 114 is applied as an input to output utilization means 120. Also shown in FIG. 1 is an optional display monitor 122 (shown in dashed lines) for displaying the image out from imager means 100. Display monitor 122 may also display information received from output utilization means 120 (e.g., captions and other indicia identifying recognized objects in the image).

Figure 2:
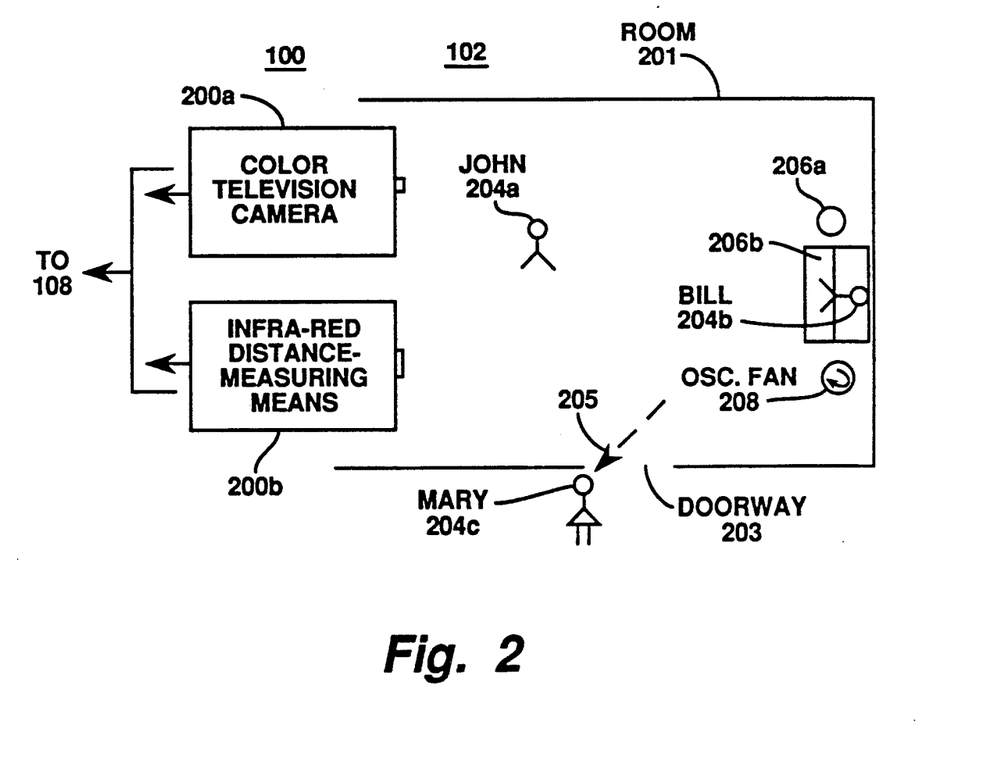
FIG. 2, is an illustrative example of the present invention employing a particular embodiment of the imaging means of FIG. 1.

FIG. 1 is a generalized showing of the system of the present invention. For a better understanding of the present invention, a specific illustrative example (shown in FIG. 2) will now be described. In FIG. 2, recognition means 100 is comprised of color television camera 200a and distance-measuring means 200b. The field-of-view of both camera 200a and distance-measuring means 200b is the interior of a room 201 having a doorway 203. Anyone of three specific individuals comprised of John 204a, Bill 204b and Mary 204c may or may not be situated in room 201 at any time. Three items, comprised of end table 206a, sofa 206b and oscillating fan 208, are permanently positioned in room 201 as shown in FIG. 2. At the time shown in FIG. 2, John 204a is standing in room 102 relatively close to the imager means comprised of television camera 200a and distance-measuring means 200b; Bill 204b, seated on sofa 206b, is situated in room 102 relatively far from imager means 100; and Mary 204c has just left room 201 through doorway 203, as indicated by arrow 205.

In the case of the illustrative examples shown in FIG. 2, it is the purpose of applicant's invention to (1) generically recognize any human being situated in room 201; (2) then specifically recognize whether any generically-recognized human being is John 204a, Bill 204b or Mary 204c; and (3) thereafter track the location in room 201 of each specifically recognized individual.

For illustrative purposes, it is assumed that preprocessor 110 takes the form shown in FIG. 3 and that object recognition means 114 and stored data 118 take the form shown in FIG. 4. For the sake of clarity, in FIGS. 3 and 4, the respective connections of stored program 116 to preprocessor 110, object recognition means 114 and stored data 118 have been omitted. However, it should be understood that the sequence of operation of each of the subsystems is controlled by stored program 116.

As indicated in FIG. 3, preprocessor 110 is comprised of color filter, frame and distance memories 300, image orientation transformation means 302 and moving-object means 304. As indicated in FIG. 4, object recognition means 114 is comprised of size adjustment means 400, template orientation transformation means 401, oriented-pattern-shape correlation means 402, probability determining means 404, fleshtone detector 406, gates 408, window-control means 410 and gate 412. As further indicated in FIG. 4, stored data 118 is comprised of initially-stored, multiple-view, multi-resolution templates 118a, stored locations of stationary objects 118b, and after-stored recognition enhancement data 118c.

It is assumed that the initially stored templates 118a includes previously recorded image data defining full face, left profile and right profile views of the head or selected portions thereof of each of John 204a, Bill 204b and Mary 204c at a number of different resolutions. While lower resolution templates may include the entire head or face of the specific individual, higher resolution templates would be restricted to only a relatively high information section of the individuals face. For instance, a high resolution template may comprise a horizontal strip across the individual's face that shows his or her ears, eyes and bridge of the nose (i.e., contains high recognition information that may be used to discriminate between one specific individual and another). In addition, preferably only at low resolution, templates 118a include one or more templates of a human body form, generic head or other pattern shapes that graphically distinguish the form of human objects from that of other objects.

Returning to FIG. 3, the portion of the input from A/D converter 108 corresponding to the real time output from color television camera 200a, in digital form, is first color filtered by the color filter portion of block 300 to separate the luminance (Y) portion from the chrominance (I, Q) portions (assuming that the output from color television camera 200a is in standard NTSC form). Should the separate luminance and chrominance portions of the output from television camera 200a be applied in digital form directly to block 300 (either as separate red, green and blue signals or as separate L, I, Q signals), the color filter portion of block 300 may be omitted. In any event, the one or more successive frames of luminance and chrominance information are temporarily stored in the frame memory portion of block 300.

Distance-measuring means 200b and color television camera 200a are scanned vertically and horizontally over the same field-of-view 102 but not necessarily at the same frame rate. Distance measuring means 200b may operate by measuring the time interval between the transmission of an infra-red pulse and the receipt of an echo therefrom, with the distance being determined by the length of this interval, as in radar. The reason for employing infra-red radiation, rather than visual light radiation, for distance-measuring means 200b is to prevent the variable intensity of ambient light in room 201 from affecting sensitivity of distance-measuring means 200b. In any event, the output information from distance-measuring means 200b, in digital form, is temporarily stored in the distance memory portion of block 300.

Alternatively, scale and distance information can be obtained through a pattern matching process that adjusts the scale of a stored template or the current image to obtain a best match therebetween.

Assuming that the sample rate for the television information and for the distance information are the same, the distance memory will have an individual distance storage location corresponding to each individual television pixel storage location of a television frame memory. Therefore, during synchronized readout of both a television frame memory and it corresponding distance memory, the horizontal (X) and the vertical (Y) pixel coordinates are available from the readout addresses of the frame memories, and the distance (Z) coordinate for each readout pixel is available from the information stored in the distance memory location of that pixel. Thus, as indicated in FIG. 3, one of the outputs from block 300 is the X, Y and Z pixel coordinates of each successively readout pixel. Further, assuming that the chrominance information is stored in block 300 in standard I Q form, read out of a television frame memory of block 300 results in the derivation of a color output from block 300, which provides the corresponding I Q values of each successively readout pixel.

The simple, well known technique for separating moving-objects from stationary objects is to subtract corresponding pixels of two successively occurring frames of television image information, thereby substantially removing the pixels of stationary objects. Thus, the pixels of the difference frame correspond only to moving-objects. If the pixels of this difference frame are then subtracted from the pixels of the current frame, the resulting frame contains solely stationary objects. While moving-object means 304 may take this well known simple form, it would not be the most preferable implementation of moving-object means 304 for the purposes of the present invention. For purposes of the present invention, it is desired to use the fact that human beings are movable objects as a feature for discriminating between human beings and non-human beings. While oscillating fan 208, like end table 206a and sofa 206b, is a permanent background object in room 201, oscillating fan 208 is also a moving-object. It would be desirable, from the point of view of the present invention, to provide an implementation of moving-object means 304 in which moving background objects, such as oscillating fan 208, are regarded as stationary objects, despite the fact that they are moving. Therefore, such a moving-object means 304 would discriminate between moving foreground objects and all background objects (which are considered to be stationary).

As discussed above, the locations of stationary objects are stored in section 118b of stored data 118. As a preliminary operation of the system, in order to obtain the data that is stored in section 118b of stored data 118, color television camera 200a and distance-measuring means 200b may be operated with all three of the individuals John 204a, Bill 204b, and Mary 204c not being present in room 201 in order to derive images of solely the permanently stationary background objects, which are all that are present in room 201 during this preliminary operation. The images obtained by this preliminary operation are then forwarded for storage in the stored locations of stationary objects 118b section of stored data 118, using moving-object means 304 for this purpose.

A more desirable implementation of moving-object means 304 assumes that the stationary object information forwarded from moving-object means 304 for storage in section 118b of stored data 118, is also available for use by moving-object means 304 itself. During the operation of the system, eliminating the background by subtracting the pixels thereof from the pixels of the current frame, in order to obtain moving (foreground) objects, results in also subtracting the background from the foreground, thus distorting the foreground image. A less simple, but superior implementation of moving-object means 304, avoids this distortion by first performing a conditional subtraction in which a pixel of the background is subtracted from the corresponding pixel in the current image only if they are sufficiently close in value. If they are not close in value, the corresponding pixel itself of the current image is employed. However, if they are close in value, so that the subtraction in made, the value zero is tentatively substituted for that pixel. Should the tentative value of a pixel be zero, an estimate for the value of that pixel is computed based on a weighted average of pixels surrounding that pixel over a given region thereabout. If the weighted average is above a given threshold, the corresponding pixel value of the current image is substituted, otherwise the tentative value of zero is employed for that pixel. The benefit of such a superior moving-object means is that it minimizes both distortion and noise, as well as false subtractions that occur when the pixel values of foreground pixels are close to those of the background (which would result in a foreground image that is full of "holes", and is not suitable for subsequent processing).

Regardless of its particular implementation, moving-object means 304 provides an output indicative of those pixels which represent moving (foreground) objects for use by object recognition means 114. Further, the moving-object information may be returned to block 300 for storage, or selectively forwarded to multi-resolution pyramid processor 112 either directly or, if desired, after further storage within block 300.

Image orientation and transformation means 302 employs standard orientation transformation algorithms to rotate image data about each of one or more axes through a small predetermined angle on either side of an adjustable operating point with respect to that axis (i.e., the image is dithered back and forth about the operating point). Block 402 of object recognition means 114 feeds back a control input to transformation means 302, adjusting the value of the operating point for each axis in accordance therewith. Image data, as received by block 300 from color television camera 200a either before or after storage in a frame memory thereof, may be applied to block 302 for transformation of its orientation. The transformed image data is then returned to block 300 for storage in a frame memory thereof. Further, block 302 may be connected to template orientation transformation means 401 of object recognition means 114.

Image data stored in block 300, preferably after modification by image orientation transformation means 302 and moving-object means 304, is read out of a frame memory of block 300 and applied as an input to multi-resolution pyramid processor 112.

Referring now to FIG. 4, there is shown an illustrative embodiment of object recognition means 114 together with an illustrative embodiment of stored data 118. As indicated in FIG. 4, color information (e.g., I and Q) is applied from preprocessor 110 as a first input to fleshtone detector 406 and the X and Y pixel coordinates are applied from preprocessor 110 as a second input to fleshtone detector 406. Fleshtone detector 406 derives, as an output, the X and Y pixel coordinates of those portions, if any, of image chrominance which are fleshtone in color. Preferably, fleshtone detector 406 is a device that plots the value of I against the value of Q, and derives a fleshtone output only if the respective values of I and Q, which define the applied color, lie within a rectangle in which the value of I is between a relatively small predetermined positive value and a relatively large predetermined positive value, and the value of Q is equal to or less than a relatively small predetermined absolute value. The fleshtone X, Y pixel coordinate output from detector 406 is applied both as one of three signal inputs to probability determining means 404 and to gates 408.

Moving-object information, applied from preprocessor 110 and defining the X and Y pixel coordinates of moving image data, is supplied directly as both a second signal input to probability determining means 404 and to gates 408.

Template orientation transformation means 401, which is generally similar to the above-described image orientation transformation means 302, is capable of simultaneously receiving any combination of one or more of three inputs (designated L, C and R, respectively) from section 118a of stored data 118. In addition, control inputs are applied to transformation means 401 from transformation 302 of preprocessor 110 and also from the correlation-value output from correlation means 402. The output from transformation means 401 is applied through size adjustment means 400 as a first of three inputs to correlation means 402 from stored data 118. Second and third inputs from stored data 118 are applied directly to correlation means 402 from sections 118b and 118c of stored data 118. Further, the Z pixel coordinate is applied as a control input to size adjustment means 400 and the X and Y pixel coordinates are applied as inputs to correlation means 402. Correlation means 402 receives an additional input from the output of multi-resolution pyramid processor 112.

The basic function of correlation means 402 is to correlate image data from multi-resolution pyramid processor 112 with template image data from section 118a of stored data 118 in a highly discriminating manner. The fact that the correlated pattern shape is oriented increases the precision of the correlation. Further, the availability from section 118b of stored data 118 of the pixel locations of stationary objects makes it possible for correlation means 402 to remove from consideration the presence of such stationary objects in the image data supplied thereto from pyramid processor 112. Also, correlation means 402 may make use of image information not necessarily present in the current input thereto from multi-resolution pyramid processor 112, but available from earlier operation of the object recognition system of the present invention which is stored in section 118c of stored data 118. A more detailed discussion of the operation of correlation means 402 is set forth below. In any event, correlation means 402 derives a first output indicative of the current computed correlation value at that time, which is applied as the third of the three inputs to probability determining means 404, and is also fed back to each of transformation means 302 and 401, as discussed above. In addition, correlation means 402 applies a second output as the third of the three signal inputs to gates 408. This second output from correlation means 402 is comprised of the X and Y pixel coordinates of image area that correspond to the size-adjusted current template then being applied to correlation means 402, which acts as the reference pattern shape with which the image data from multi-resolution pyramid processor 112 is being correlated.

Probability determining means 404 is controlled in accordance with decision criteria currently applied thereto from stored program 116. In accordance with these decision criteria, means 104 assigns certain weights to the respective correlation value, fleshtone, and moving inputs thereto. As long as the probability computed from the weighted values of the three inputs remains below a predetermined threshold defined by the current decision criteria from stored program 116, no "enable" output is derived from probability determining means 404. However, if the computed probability rises above this predetermined threshold (but remains below a still higher threshold determined by the current decision criteria), probability determining means 404 derives an "enable-1" output. Probability determining means 404 derives an "enable-2" output in response to the computed probability rising above the aforesaid higher threshold.

The "enable-1" output is applied as a control input to gates 408. In response thereto, gates 408 forward as first, second and third inputs to section 118c of stored data 118, for storage therein, the current correlated X, Y pixel coordinates, the current fleshtone X, Y pixel coordinates and the current moving pixel X and Y coordinates. In addition, the correlated X and Y pixel coordinates are applied as an input to window-control means 410 (which preferably operates in accordance with the teaching of Anderson et al), and the output from window-control means 410 is fed back as a control input to pyramid processor 112. Further, in response to probability determining means 404 computing a probability in the range between the predetermined and higher thresholds of the respective enable-1 and the enable-2 outputs therefrom, the probability determining means 404 feeds back a control signal to stored program 116 for indicating that stored program 116 should initiate a new cycle of operation of the system.

The occurrence of the "enable-2" output is indicative of the fact that an object in the imaged scene, such as John 204a or Bill 204b has been recognized as being the object depicted in one or more particular templates initially stored on section 118a of stored data 118. The "enable-2" output is applied as a control input to gate 412. In response thereto, gate 412 forwards a signal from stored data 118 to output utilization means 120. This signal (which may include graphic and/or alphanumeric data) identifies the recognized object and its location (i.e., ascertained pixel coordinates) in the image. Output utilization means 120 includes means responsive to the forwarded identifying signal for performing certain predetermined functions. By way of examples, output utilization means 120 may record or transmit to a central location the information contained therein along with the time of receipt, and/or provide an identifying caption for display on display monitor 122 in a location thereof which is in the immediate vicinity of the displayed image of the particular recognized object.

For illustrative purposes, in describing the operation of the present invention, it is assumed that the multiple-view, multiple-resolution templates initially stored in section 118a of stored data 118, which include templates respectively depicting John 204a, Bill 204b and Mary 204c, are derived, and then stored as an organized database in section 118a, in the manner described below.

A set of images for each of the three involved individuals is taken in a training phase for use in deriving the templates stored in section 118a of stored data 118. Each set includes respective straight-ahead (i.e., full-face), left-profile and right-profile subsets. Each subset may include a substantial variety of typical expressions of that involved person. However, several variable parameters remain fixed during the training phase. These constraints include uniform lighting, fixed distance from the camera, and no rotation or tilting of the head from the pre-assigned straight-ahead, left-profile or right-profile position. Each of the training phase images is transformed into a Laplacian, or bandpass, pyramid. This pyramid may be built from level-1, which has a pixel resolution of $256 \times 256$, down to level-5, which has a pixel resolution of only $16 \times 16$. Then, one 8×8 section of the 16×16, level-5 image, which encompasses an outline of the head and face, is saved as an icon to be included in the initially-stored database of section 118a of stored data 118. Next, three 8×8 sections may be taken from the 32×32, level-4, pyramid image. These may cover the top of the head, the middle of the face, and the chin area. They then may also be included in the initially-stored database. Finally, five 8×8 sections of the 64×64, level-3, pyramid image may be included in the initially-stored database. These latter pyramid images may cover regions of both eyes, the nose, and the left and right sides of the mouth. Thus, a total of 9 icons make up the training set for each of the original 256×256 pixel resolution subset images for each involved person (i.e., John, Bill and Mary).

Also included in the database in association with each icon, is data defining its horizontal offset location and its vertical offset location in the particular level pyramid image it was taken from.

In addition to the foregoing initially-stored icon templates, section 118a of stored data 118 may also include templates defining the shape of generic human beings. Such generic templates should be at level-5 or even a higher level of the pyramid image, and merely show the generalized shape of a human head on top of a generalized human body in one or more positions (e.g., standing or sitting).

A second preliminary operation of the above-described system (which was discussed above) is the storage in section 118b of stored data 118 of the locations of stationary (background) objects (e.g., end table 206a, sofa 206b and oscillating fan 208) in room 201.

Fleshtone is one known generic attribute which distinguishes those imaged objects comprised of an involved person and other types of imaged objects. The detection of fleshtone by fleshtone detector 406 employed by the system as one feature of interest related to this generic attribute of all the involved individuals.

Another generic attribute of human beings is that they are movable, although they need not be moving at any given moment. Further, not all objects are human beings. Nevertheless, a moving-object output from moving-object means 304 is employed by the system as another feature of interest related to a generic attribute of the involved individuals.

An additional distinguishing generic attribute of human beings is the pattern shape of the human body. The generic templates, discussed above, initially stored in section 118a of stored data 118 are features of interest related to this generic attribute of human beings.

As the frame and distance memories of block 300 are read out in accordance with the addressing thereof for each successive frame of camera 200a and distance-measuring means 200b, the system simultaneously searches for the existence of any of these three features of interest. Determination of the X and Y coordinates of each readout frame of a moving (foreground) object feature of interest or of a fleshtone feature of interest is straight forward. However, dealing with the identification pixels of a readout frame as belonging to a human-body pattern-shape is significantly more complicated. First, the shape of the two-dimensional image pattern of a human being depends upon the orientation of the three-dimensional human being with respect to camera 200a. Second, the size of this two-dimensional imaged pattern depends both on the distance of the human being from camera 200a and the then-existing size of field-of-view 102 (which may be adjustable if camera 200a has zoom capabilities). For the present, it is assumed that field-of-view 102 remains fixed. However, size adjustment means 400, described above, compensates for any difference in size of the image data in accordance with the distance-measured Z pixel coordinate applied thereto. This means that the number of templates that need be initially stored in section 118a of stored data 118 is significantly reduced.

In case of generic object recognition, template transformation means 401 is not utilized. However, the two generic templates (generic human being in standing and sitting positions, respectively) are initially operated on sequentially in successive frames to determine which one, if any, of the two templates provides the higher correlation value in any given case, after which only the template exhibiting the higher correlation value is considered.

Determining a correlation value may take the readout of several frames. From frame to frame, image orientation transformation means 302 is dithered back and forth about an initial zero operating point. Because correlation means 402 correlates oriented pattern shapes, the derived correlation value for one of the two dithered positions will normally be significantly higher than the other. In response thereto, the operating point of transformation means 302 is incrementally offset from zero in the direction indicated by the higher correlation value. This process continues until the dithered correlation values of a particular offset operating point are substantially equal to one another. In this manner, tilting of the generic human body shape image pattern is compensated for.

Alternatively, other techniques well known in the art, including simple correlation, normalized correlation, mean square error and absolute error, can be used to determine the match between a given patern and stored patterns.

As discussed above, the initial input from multi-resolution pyramid processor 112 and applied correlation means 402 is at a low resolution (i.e., at a high level of the pyramid processor) for the case of recognizing a generic human being. Initially the entire area of a frame is considered. However, in accordance with the foveation techique taught in the aforesaid Anderson et al. patent, window-control means 410, in response to the output of correlation means 402 achieving a given correlation value, switches the output from pyramid processor 112 to the next lower (higher resolution) pyramid processor level, while limiting the area of an image frame that is outputted from pyramid processor 112 to only that of a localized window region in the neighborhood of the correlated pattern shape that provided the aforesaid-achieved correlation value.

Correlation means 402 may employ respective inputs thereto from sections 118b and 118c of stored data 118 to modify the operation thereof so that a contribution of locations of stationary (background) objects to the correlation of pattern shape is ignored, and so that the weighting of the correlation value derived by correlation means 402 is increased in accordance with the already acquired stored recognition enhancement information supplied thereto.

Assume at the beginning of operation of the system, John and Bill in FIG. 2 are situated in room 201 at the location shown, with John standing motionless facing away from the camera and Bill seated motionless and facing the camera. Further, assume that in the case of John, the difference between the low resolution image of him from multi-resolution pyramid processor 112 and the generic human being template in the standing position is sufficient to produce an "enable-one" output from probability determining means 404 (although the fleshtone and moving-object inputs to probability determining means 404 are negligible for John), and that this correlation value is sufficient to cause window-control means 410 to switch multi-resolution pyramid processor 112 to the next higher pyramid processor level. In the case of Bill, assume that for the fleshtone input the probability determined by probability determining means 404 is sufficient to produce an "enable-1" output therefrom (although the correlation value and moving-object inputs to probability determining means 404 are negligible in the case of Bill). The reason for the low correlation value in the case of Bill is that, because he is sitting on the sofa, a low resolution of his image from multi-resolution pyramid processor 112 combined with that of the sofa (which is substantially at the same distance from the camera as Bill) results in a combined pattern shape which is very different from the pattern shape of a generic human being in a sitting position (and which cannot be effectively corrected at this low resolution with the stored location of stationary object information applied to correlation means 402).

"Enable-1" output from means 404 opens gates 408 and forwards the pixel coordinates of the respective locations of John and Bill as storage enhanced recognition data in section 118c of stored data 118. Therefore, in the next cycle of operation of the system, the correlation value is more highly weighted at these respective locations. Further, in the case of John, a higher resolution image only within a localized window neighborhood of John's location is correlated against a generic human shape pattern in a standing position. This results in a high correlation value over a higher resolution (and, therefore, more accurate) determination of the location of John. Further, between the first and the second cycles of operation of the system, John may have changed positions so that: (1) moving-object information is now present as an input to probability determining means 404 and (2) fleshtone is now being imaged. This increases the probability to the point at which the system conclusively presumes that John's image is at least that of a generic human being. In response thereto, probability determining means 404 returns a signal to stored program 116 that causes stored program 116, during future cycles, to control the sequence of operations of the system in a manner required to determine the specific involved person, if any, presented by this generic human pattern shape (which is actually John's image).

In the case of Bill, the second cycle of operation of the system will result in a higher correlation value or correlated X and Y pixels in the vicinity of Bill's imaged head because of the storage of the fleshtone X and Y pixel coordinates in section 118c of stored data 118 during the first cycle of operation of the system. It is assumed that the correlation value obtained during the second cycle of operation of the system is sufficiently high to cause window-control means 410 to switch the output from multi-resolution pyramid processor 112 to the next lower (higher resolution) pyramid processor level for use during the third cycle of operation of the system. It is further assumed that at this higher resolution, the effect of sofa 206b on the image pattern shape being correlated can be satisfactorily eliminated by the stationary-object information applied to correlation means 402 from section 118b of stored data 118. Therefore, the resulting correlation value obtained from the third cycle of operation of the system, together with the fleshtone information, provides a probability sufficiently high to recognize Bill's image as that of a generic human being.

It should be remembered that during each successive cycle of operation of the system during which an "enable-1" output is derived from means 404, additional enhancement information is forwarded for storage in section 118c of stored data 118 for use during the next cycle of operation of the system. Further, in response to means 404 achieving a probability during any cycle that indicates that a generic human being is situated at an ascertained location of the image, means 404 returns a signal to stored program 116 to cause the system during the next cycle of operation thereof to start the determination of which specific one of the involved individuals, if any, is represented by such ascertained generic human being.

In the determination of the identity of any of the involved persons, the full-face (C), left-profile (L) and the right-profile (R) above-described initially-stored templates for that involved person are applied from section 118a of stored data 118 as respective inputs to transformation means 401. Transformation means 401 operates in a manner similar that described above for transformation means 302 to dither back and forth to the left and to the right of a current operating point a transformation mix of the (C), (L) and (R) template data applied to its three inputs, always altering the operating point between successive frames in that direction which produces the highest correlation value of the resulting transformation mix of its three inputs, until an operating point is reached for which the left dithering and the right dithering produce substantially the same correlation value. In addition, a signal from transformation means 302 indicating the operating point of transformation means 302 may be applied as an input to transformation means 401 for fine tuning the transformation mix of transformation means 401 in accordance with the amount of image tilt that is being compensated for by transformation means 302. With all of this information, transformation means 401 can derive a synthesized template (e.g., a three-quarter left face template) output, that is forwarded as an input to size adjustment means 400, which will, to a great extent, compensate for changes in the two-dimensional image of an involved person's head due to the actual changes in the orientation of that person's head in three-dimensional space.

After the location of an imaged generic human being has been recognized, correlation means 402 makes use of the initially-stored multiple-view, multi-resolution icon templates discussed above, that form a database, for the purpose of specifically recognizing which one of the three involved persons (John, Bill or Mary), if any, is represented by that particular generically recognized human being. At the beginning of this specific-recognition process, the enhancement data already stored in section 118c provides a 16×16 image pixel window which includes the location of that generically-recognized human being.

The following specific-recognition process assumes, for illustrative purposes, that correlation means 402 itself includes temporary storage means employed to total sequentially derived correlation-value increments for that involved person (although it should be understood that the specific-recognition process could employ section 118c of stored data 118 for such purpose). Specifically, the 16×16 image window, level-5, from pyramid processor 112 is compared to the initially-stored level-5 icon in the database for each of the three involved persons, and the resulting normalized correlation value (which can vary in value between −1.0 and +1.0) is separately temporarily stored for each of the involved persons. Similar comparisons for each of the three involved persons are then made at the level-4 resolution for each of the three level-4 icons in the database, and then, in turn, at the level-3 resolution for each of the five level-3 icons in the database.

As discussed above, there is stored in the database, in association with each icon stored therein, data defining that icon's horizontal offset location and vertical offset location in the particular level pyramid image it was taken from. Therefore, for each involved person, each of the three level-4 resolution icons in the database, and each of the five level-3 resolution icons in the database are known and are part of the stored information in section 118a. Each of these level-4 and level-3 resolution comparisons and their respective offsets are taken into consideration in defining the location of a 15×15 cell image window in each of the level-4 and level-3 resolution comparisons for each of the involved persons. This improves the speed of the system by preventing unnecessary searches of the area where icons are unlikely to be.

The reason for the increasing number of icons at higher resolution is that higher resolution icons have more variability and hence are more subject to slight changes in the imaged person's expression from time to time during the training phase. Having a greater number of icons reduces the possibility that a particular training set is discounted because of a small change in a high frequency feature. In any event, that one of the three level-4 icons for each of the involved persons that exhibits the highest normalized correlation value has its normalized correlation value added to the stored level-5 normalized correlation value. Similarly, the highest normalized correlation value of the five level-3 icons are added to the sum of the level-5 and highest level-4 normalized correlation values. Thus, for each of the involved persons, there will be an overall sum of the normalized correlation values that can vary in value between −3.0 and +3.0. Whatever this value is, it is applied to probability determining means 404, and if it is at least equal to the second threshold value, probability determining means 404 derives an "enable-2" output that opens gate 412. In response thereto, gates 412 will forward identity and pixel location of the specifically-recognized one of the three involved persons (i.e., John, Bill or Mary) to output utilization means 120. If the highest correlation value is below the threshold, it will be assumed that the generically recognized human being is not anyone of the three involved persons.

The above discussion has assumed that none of the three involved persons has been previously specifically recognized. If the third one of the involved persons has been specifically recognized, the system will operate to continuously track the location of that specifically recognized individual, taking full advantage of the moving-object (foreground) information provided to probability determining means 404, and the location (i.e., the ascertained pixel coordinates) of that specifically recognized person stored in section 118c of stored data 118 (which is being continuously being updated). Thus, if it is assumed that Mary has been previously specifically recognized, but has since left room 201 by doorway 203 (as indicated by arrow 205 in FIG. 2), the sudden loss of her image will be recognized in the tracking mode of operation of the system.

Further, if one of the involved persons has been already been specifically recognized by the system, it would serve no useful purpose for the system to consider the database icons of that person in attempting to specifically recognize another generically recognized imaged human being. Therefore, the above-describes specific-recognition process may be speeded up for a second involved person, by deleting from consideration the previously stored icons of all already specifically-recognized involved persons in the current image.

Plainly, the dynamic image-processing technique for recognizing objects of the present invention is not limited in its use to the illustrative example, described in great detail above, (i.e., recognizing (1) the presence of a generic human being within a room, and (2) then recognizing whether the generically recognized human being is a specific one of a group of known involved persons). Another example to which the present invention could be applied with great advantage would be complex automatically-controlled systems, such as surveillance television cameras, robotic systems and target tracking systems. Still other example would be in machine vision employed in manufacturing, wherein the present invention is particularly suitable for specifically recognizing each of various predetermined components to be automatically assembled or sorted.

Returning to FIG. 1, there is shown additional features of the present invention, not previously discussed, which may be employed both in the illustrative example and in other examples of the operation of the present invention. For instance, information derived by object recognition means 114 may be employed to control the orientation and/or control the zooming of the field-of-view of imager means 100. In this case, imager means 100 would return servo information back to object recognition means 114. Further, output utilization means 120 could include recording equipment for recording the object recognition information provided thereto from object recognition means 114 for later use, or such information may be telemetered by output utilization means 120 to a location remote from that which the object recognition information was gathered.

The embodiment of the invention broadly shown in FIG. 1 is considered to be the most efficient implementation of the present invention. First, in the disclosed embodiment, new image information is continuously being gathered in real-time, while the object recognition process is taking place. Second, the multi-resolution pyramid processor incorporates a controllably-movable window that is used to efficiently reduce the image data that need be considered to a minimum.

Other than operating on image data as it is being obtained in real-time, it is possible to record all of a block of image data, consisting of a large number of successive frames, before dynamically processing the image data in this block of image data for object recognition purposes. Further, data reduction need not be performed by a multi-resolution pyramid processor, since other data reduction techniques exist in the art which could be used for object recognition purposes.

In FIG. 1, imager means that image real three-dimensional objects is utilized to obtain image data. However, it should be understood that such image data may be obtained by other means. By way of example, the image data could be computer generated or it may be obtained by animated-cartoon techniques.

The illustrative example of the operation of the object recognition system of the present invention, described in detail above, uses, as features-of-interest that are employed by probability determining means 404, (1) color (i.e.; fleshtone), (2) pattern shape and (3) moving of foreground objects. It should be understood that other features of interest may be used as discriminants for object recognition purposes, in addition to or instead of color, pattern shape or moving-object information.

What is claimed is:

1. A dynamic image-processing method for recognizing objects of a given class graphically represented in a time series of successive relatively high-resolution frames of image data; said method being responsive to (A) a stored program for controlling said image-processing and for specifying a set of decision criteria, and (B) stored data;

wherein objects of said given class all possess a group of known generic attributes which, taken as a whole, distinguish objects of said given class from objects not of said given class; and wherein said stored data initially defines a limited number of separate features related to said group of generic attributes, any of which initially stored features is likely to be present in a sequence of one or more successive frames of image data if an object of said given class is graphically represented in that sequence;

said method comprising the steps of:

a) under the control of said stored program and in response to at least a first one of said separate features initially defined by said stored data, making a first determination in accordance with said decision criteria as to a first probability that one or more relatively early-occurring frames of said time series may include as part of said image data thereof at least said first one of said separate features of objects of said given class;

b) in response to said first probability being at least equal to a first predetermined threshold value, adding data defining at least the relative location of said part within the relatively early-occurring frames of said sequence to said stored data, thereby enhancing said stored data;

c) under the control of said stored program and in response to said enhanced stored data, making a second determination in accordance with said decision criteria as to a second probability that one or more relatively later-occurring frames of said time series verifies said part as including at least a second one of said separate features in addition to said first feature;

d) in response to said second probability being above a second predetermined threshold, recognizing said part as being a graphical representation of an object of said given class;

e) in response to said second probability being below a third predetermined threshold which third predetermined threshold is significantly below said second predetermined threshold, recognizing said part as not being a graphical representation of an object of said given class;

f) in response to said second probability being in a range between said second and third probabilities, adding further data defined by the verification of step c) to said stored data, thereby further enhancing said stored data; and g) if said second probability is in said range, recursively repeating steps c) and f) for relatively later and later occurring sequences of one or more frames of said time series until the probability determined by such repeated step d) either rises above said second predetermined threshold or falls below said third predetermined threshold.

2. The method defined in claim 1, wherein said method further comprises the step of:

analyzing each of said successive relatively high-resolution frames of image data into a multi-resolution pyramid comprised of at least one level that exhibits a lower resolution than that of said high-resolution frames prior to step (a);

wherein in step (a) the first probability is the probability with which any of the lower-resolution levels of the multi-resolution pyramid of a sequence of one or more relatively early-occuring frames of said time series may include as part of said image data thereof at least said first one of said separate features of objects of said given class; and wherein in step (c) the second probability is the probability that any of the levels of the multi-resolution pyramid of a sequence of one or more relatively later-ocurring frames of said time series verifies said part as including at least a second one of said separate features in addition to said first feature;

3. The method defined in claim 2, wherein said graphic representation of objects of said given class comprises a two-dimensional representation of a movable three-dimensional object, whereby the location, size and/or shape of said two-dimensional representation in a frame of said movable object may vary from one frame to another.

4. The method defined in claim 3, wherein said time series of sucessive frames are comprised of two-dimensional representations of actual three-dimensional objects viewed by a camera, at least one of said viewed actual three-dimensional objects being movable.

5. The method defined in claim 4, wherein said given class of objects is comprised of human beings, and said group of known attributes includes attributes of the human face.

6. The method defined in claim 4, comprising the further steps of:

h) continually measuring the distance between the television camera viewing said movable object and said movable object to obtain current measurement data of said distance; and i) utilizing said current measurement data together with said enhanced stored data in the performance of step c) to make said second determination.

7. The method defined in claim 2, wherein:

said given class of objects is comprised of a plurality of preselected members, each of which preselected members of said given class is individually defined by possessing a unique set of known species of each of at least a sub-group of said known generic attributes; and for each species of each one of said generic attributes of said sub-group, said stored data includes a separate species-feature related to a graphical representation of that species of that one generic attribute in a particular pyramid level of said successive frames, said method comprising the further steps of:

h) under the control of said stored program, and in response to said part being recognized as a graphical representation of an object of said given class, comparing, in turn, each separate stored species-feature related to each different species of a first given one of said generic attributes of said sub-group at a particular pyramid level with said part to determine which of said compared species corresponds to said part with a highest probability that is greater than a predetermined threshold probability; and i) repeating step h), in turn, for each separate stored species-feature related to each different species of each other given one of said generic attributes of said sub-group at a particular pyramid level, thereby determining the unique set of known species graphically represented by said part and the preselected individual member, if any, defined by that unique set.

8. The method defined in claim 7, wherein said graphic representation of objects of said given class comprises a two-dimensional representation of a movable three-dimensional object, whereby the location, size and/or shape of said two-dimensional representation in a frame of said movable object may vary from one frame to another.

9. The method defined in claim 8, wherein said time series of successive frames comprise television frames of actual three-dimensional objects viewed by a television camera, at least one of said viewed actual three-dimensional objects being movable.

10. The method defined in claim 9, wherein said given class of objects is comprised of human beings, and said group of known attributes includes attributes of the human face, whereby said preselected individual members of said given class are comprised of preselected persons.

11. An image-processing system for dynamically recognizing objects of a given class graphically represented in a time series of successive relatively high-resolution frames of image data; wherein objects of said given class all possess a first group of known generic attributes which, taken as a whole, distinguish objects of said given class from objects not of said given class and each known member of said given class possesses a second group of known specific attributes which, taken as a whole, distinguish that known member from other members of said given class; said system comprising:

first means for storing a stored program for controlling said image-processing and for specifying a set of decision criteria, second means for storing data which includes a set of initial data, said initial data defining a limited number of separate features related to at least said first group of generic attributes, any of which initially stored features is likely to be present in a sequence of one or more successive frames of image data if an object of said given class is graphically represented in that sequence;

third means coupled to said first and second means for (1) making a first determination in accordance with said decision criteria as to a first probability that one or more relatively early-occurring frames of said time series may include as part of said image data thereof at least said first one of said separate features of objects of said given class; (2) in response to said first probability being at least equal to a first predetermined threshold value, storing additional data in said second means that defines at least the relative location of said part within the relatively early-occurring frames of said sequence, thereby enhancing the data stored in said second means; (3) making a second determination in accordance with said decision criteria as to a second probability that one or more relatively later-occurring frames of said time series verifies said part as including at least a second one of said separate features in addition to said first feature; (4) in response to said second probability being above a second predetermined threshold, recognizing said part as being a graphical representation of an object of said given class; (5) in response to said second probability being below a third predetermined threshold which third predetermined threshold is significantly below said second predetermined threshold, recognizing said part as not being a graphical representation of an object of said given class; (6) in response to said second probability being in a range between said second and third probabilies, storing in said second means further additional data that is defined by said second determination, thereby further enhancing the data stored in said second means; and (7) if said second probability is in said range, recursively making additional determinations for relatively later and later occurring sequences of one or more frames of said time series until the probability determined by the final additional determination either rises above said second predetermined threshold or falls below said third predetermined threshold.

12. The system defined in claim 11 further comprising:

means for analyzing each of said successive relatively high-resolution frames of image data into a multi-resolution pyramid comprised of at least one level that exhibits a lower resolution than that of said high-resolution frames; and wherein third means are coupled to said first, second and analyzing means for (1) making a first determination in accordance with said decision criteria as to a first probability with which any of the lower-resolution levels of the multi-resolution pyramid of a sequence of one or more relatively early-occurring frames of said time series may include as part of said image data thereof at least said first one of said separate features of objects of said given class; (2) in response to said first probability being at least equal to a first predetermined threshold value, storing additional data in said second means that defines at least the relative location of said part within the relatively early-occurring frames of said sequence, thereby enhancing the data stored in said second means; (3) making a second determination in accordance with said decision criteria as to a second probability that any of the levels of the multi-resolution pyramid of a sequence of one or more relatively later-occurring frames of said time series verifies said part as including at least a second one of said separate features in addition to said first feature; (4) in response to said second probability being above a second predetermined threshold, recognizing said part as being a graphical representation of an object of said given class; (5) in response to said second probability being below a third predetermined threshold which third predetermined threshold is significantly below said second predetermined threshold, recognizing said part as not being a graphical representation of an object of a said given class; (6) in response to said second probability being in a range between said second and third probabilities, storing in said second means further additional data that is defined by said second determination, thereby further enhancing the data stored in said second means; and (7) if said second probability is in said range, recursively making additional determinations for relatively later and later occurring sequences of one or more frames of said time series until the probability determined by the final additional determination either rises above said second predetermined threshold or falls below said third predetermined threshold.

13. The system defined in claim 11, wherein said graphic representation of objects of said given class comprises a two-dimensional representation of a movable object, whereby the location of said two-dimensional representation in a frame of said movable object may vary from one frame to another; and wherein said system further includes:
   moving-object means responsive to said successive frames of image data for deriving the respective pixel locations in a frame of those pixels that define the graphical representation of moving objects; and
   wherein said third means is coupled to said moving-object means for employing said respective pixel locations of said moving objects as an additional feature in making said probability determinations and, in response to the probability being determined to be in said range, storing them as additional data in said second means.

14. The system defined in claim 11, wherein said graphic representation of objects of said given class comprises a two-dimensional representation of an object having predetermined color hue characteristics; and wherein said system includes:
   color-detecting means responsive to said successive frames of image data for deriving the respective pixel locations in a frame of those pixels that define the graphical representation of objects having said predetermined color hue characteristics; and
   wherein said third means is coupled to said color-detecting means for employing said respective pixel locations of said objects having said predetermined color hue characteristics as an additional feature in making said probability determinations and, in response to the probability being determined to be in said range, storing them as additional data in said second means.

15. The system defined in claim 11, wherein among the features defined by the initial data stored in said second means are predetermined pattern shapes associated with the two-dimensional graphical representation of said objects of said given class; and wherein said third means includes:
   matching means for correlating pattern shapes defined by the pixels constituting each successive frame of image data at a certain resolution against each of said predetermined pattern shapes, and for employing the correlation values derived thereby in the making of said probability determinations; and
   means responsive to the probability being determined to be in said range for storing the locations of the correlated pixels in said second means.

16. The system defined in claim 15, wherein said time series of successive frames is comprised of two-dimensional representations of actual three-dimensional objects viewed by imaging means including a camera and distance-measuring means, at least one of said viewed actual three-dimensional objects being movable, whereby the size of a two-dimensional representation of an actual three-dimensional movable object varies in accordance with the distance of said actual three-dimensional movable object from said camera, and said image data for each frame includes distance data corresponding to each of the two-dimensional pixel locations of that frame; and wherein said third means further includes:
   size-adjusting means responsive to said distance data for scaling the size of said predetermined pattern shapes that are correlated by said correlation means in accordance with said distance data, whereby the number of scaled sizes of each predetermined pattern shape that is required to be initially stored is minimumized.

17. The system defined in claim 15, wherein said time series of successive frames is comprised of two-dimensional representations of actual three-dimensional objects viewed by imaging means including a camera, at least one of said viewed actual three-dimensional objects being movable, whereby the pattern shape of a two-dimensional representation of an actual three-dimensional movable object varies in accordance with the orientation of said actual three-dimensional movable object with respect to said camera; and wherein said third means further includes:
   orientation-transformation means responsive to the correlation value derived by said matching means for continually varying the orientation of at least one of the two pattern shapes then being correlated against each other until the correlation value is maximized.

18. The system defined in claim 17, wherein said initially-stored pattern shapes include a plurality of stored pattern shapes each of which corresponds to a two-dimensional representation of the same three-dimensional object of said given class in a different predetermined orintation thereof; and wherein said orientation-transformation means includes:
   pattern-shape-orientation transformation means for deriving a computed pattern shape from said plurality of stored pattern shapes which has an orientation which is a variable mix of the respective different orientations of said plurality of stored pattern shapes and said pattern-shape-orientation transformation means being responsive to the correlation value derived by correlating said computer pattern shape against a pattern shape derived from said image data for continually varying the mix of said plurality of stored pattern shapes until the correlation value of the two pattern shapes then being correlated against each other is maximized.

19. The system defined in claim 15, wherein said time series of successive frames is comprised of two-dimensional representations of actual three-dimensional stationary and movable objects of a scene viewed by imaging means including a camera; wherein all objects of said given class in said scene are movable; wherein said second means stores the respective pixel locations of the pattern shape of the two-dimensional representation of each stationary object in said scene as viewed by said camera; and wherein:

said matching means is responsive to the stored respective pixel locations of the pattern shape of the two-dimensional representation of each stationary object for excluding that stationary-object pattern shape present in each frame of image data from being correlated against each of said predetermined pattern shapes.

* * * * *